United States Patent Office 2,908,556
Patented Oct. 13, 1959

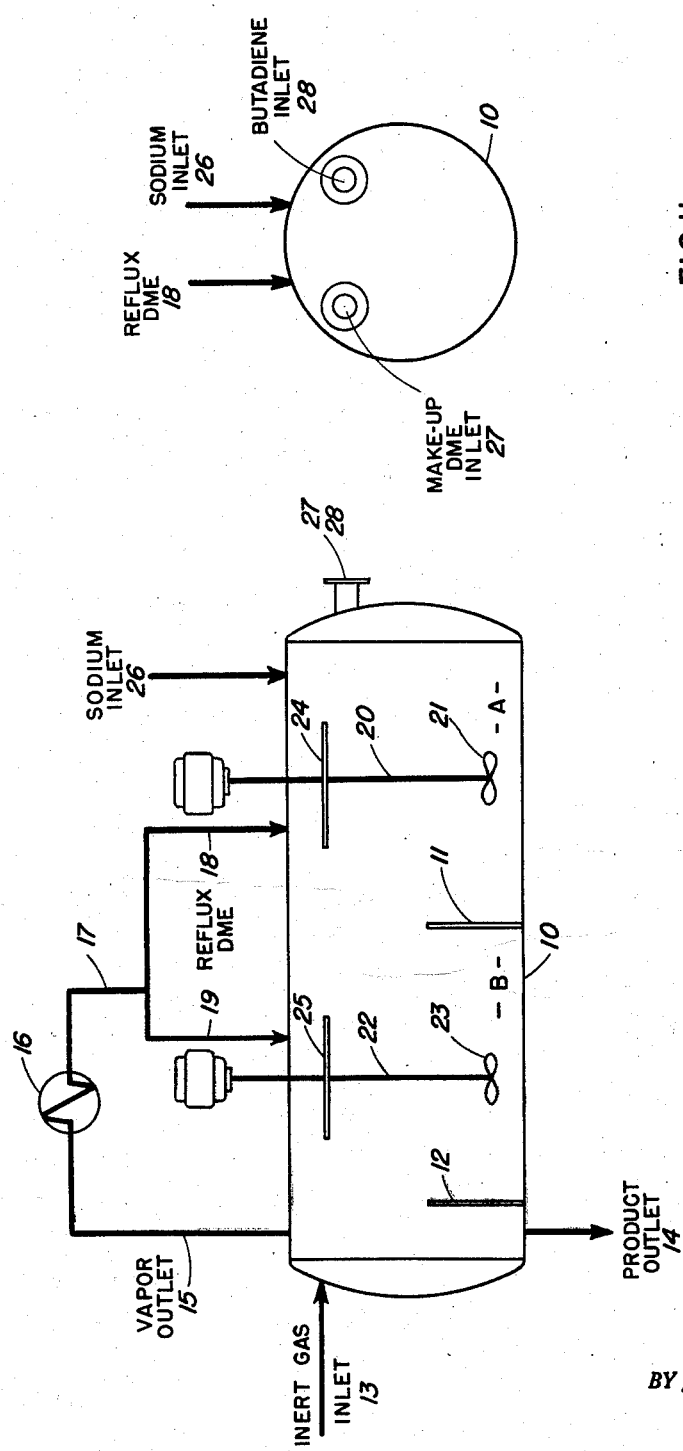

2,908,556

REACTOR DESIGN

Lloyd M. Watson, Cincinnati, Ohio, and Donald P. Jenks, Tuscola, Ill., assignors to National Distillers and Chemical Corporation, New York, N.Y., a corporation of Virginia Application August 8, 1957, Serial No. 677,022

5 Claims. (Cl. 23—263)

The present invention relates to a novel apparatus adapted for carrying out reactions of an alkali metal with a dimerizable olefin in the presence of a liquid reaction medium to form the corresponding alkali metal derivatives of dimers of the olefin. Illustrative dimerization processes of that type are disclosed in co-pending applications, S.N. 382,456, filed September 25, 1953 (now U.S. Patent 2,816,916); S.N. 394,497, filed November 25, 1953 (now U.S. Patent 2,816,913); S.N. 398,218, filed December 14, 1953 (now U.S. Patent 2,816,917), and others. In such processes, the alkali metal in finely divided form is reacted with a dimerizable olefin in presence of a liquid reaction medium under conditions to selectively form dialkali metal derivatives of dimers of the olefin. As specific illustrations, an aliphatic conjugated diolefin such as butadiene is reacted with finely divided alkali metal such as sodium to selectively form disodiooctadienes and, in the use of styrene as the dimerizable olefin, there is obtained selective formation of disodiodiphenyl butane. Such selective dimerization reactions are carried out in the presence of a liquid reaction medium that is chemically inert to the reactants and reaction products with preferred mediums being ethers selected from certain classes of ethers as defined more fully hereinafter.

In general, such selective dimerization reactions are carried out by feeding into a reaction vessel (1) finely divided alkali metal dispersed in a suitable inert liquid carrier (preferably, a saturated liquid hydrocarbon or an ether of the hereinafter defined type), (2) the particular olefin to be dimerized, and (3) the liquid reaction medium. If desired the olefin may be fed together with the liquid reaction medium, e.g., butadiene in dimethyl ether in a reflux stream. By controlling the reaction conditions, including effective agitation of the reaction mixture and temperature control to below about 30° C., and preferably below about 0° C., selective dimerization occurs whereby there is obtained a reaction mixture comprising the dialkali metal dimers of the olefin. Generally, such reactions are carried out under conditions of temperature and pressure correlated to substantially maintain the liquid reaction medium at its boiling point whereby some vaporization of the liquid reaction medium occurs. In such processes carried out in continuous, semi-continuous or batch manner, the relative amount of liquid reaction medium employed is such that the reaction mixture can be handled without substantial difficulty, i.e., the relative amount of liquid reaction medium is controlled so as to produce a reaction mixture, containing the desired dimer products, that is in the form of a flowable or pumpable slurry. As a result, the reaction mixture can be withdrawn from reaction vessels without undue difficulty even by gravity flow for conveyance of the reaction mixture to suitable vessels for carrying out further reactions with the dimer products, such further reactions including carbonation to convert the dialkali metal dimers to dialkali metal salts of dicarboxylic acids containing two more carbon atoms per molecule than the dimer.

Inasmuch as such selective dimerized reactions are carried out by maintaining the reacting mixture under effective agitation, a substantial amount of splashing of reaction mixture occurs onto the interior walls of the reaction vessel. As the dialkali metal dimer products thus produced have a decided tendency to adhere to the vessel walls, build-up of a substantially solid cake of dimer product and side reaction products occurs on the vessel walls above the reaction mixture. Although such a build-up of cake does not materially effect the selective dimerization reaction, it is objectionable. For example, upon continued use of the reaction vessel, and particularly in a continuous operation, the cake build-up enhances clogging of inlets for feed material to the reaction vessels thereby requiring frequent shutdowns for cleaning out the vessel, feed inlets, etc. Such shutdowns are not only time consuming and expensive but, of considerable importance, they present a substantial hazard as the selectively formed dimer products are generally pyrophoric in nature thereby requiring precautions to exclude air from the reaction vessel while the cleaning operation is being carried out.

The main object of this invention is the provision of a novel apparatus useful for carrying out reactions as aforediscussed with obviation or substantial minimization of build-up of solid or solid-like deposits on the interior walls of the reaction vessel and particularly on the wall area of the vapor space above the reaction mixture normally existing in such vessels while the selective dimerization reaction is being carried out under effective agitation.

In accordance with this invention, there is provided an apparatus comprising a horizontally elongated vessel containing a plurality of transverse vertically disposed, spaced-apart baffle means, said baffle means being substantially short of the top of said vessel thereby providing a plurality of compartments extending from one end of said vessel to its other end, inlet means for introducing a dimerizable olefin, a finely divided alkali metal (dispersed in a liquid medium) and liquid reaction medium into the first of said compartments at one end of said vessel, agitating means for maintaining reaction mixture in said first compartment under effective agitation, outlet means at the bottom of the opposite end portion of said vessel for product withdrawal from said vessel, vapor outlet means at the top of said opposite end portion of the vessel for withdrawal of vapor from said vessel, condensing means for condensing liquid reaction medium from said withdrawn vapor, means for introducing said condensed liquid reaction medium into said vessel at a portion thereof in the vapor space above said first compartment, and means disposed in the vapor space above said first compartment but short of the top of said vessel adapted to disperse said condensed liquid reaction medium onto the inner wall surfaces of said vessel to maintain said surfaces substantially free of adhering solid-like deposits.

In a more specific embodiment, an apparatus as embodied herein comprises a horizontally elongated vessel containing two transverse vertically disposed, spaced-apart baffle means short of the top of said vessel thereby providing a three-compartmented vessel, the first of which compartments is defined by one end portion of said vessel and a first baffle, the second compartment being defined by said first baffle and a second baffle and the third compartment being defined by said second baffle and the opposite end of said vessel, separate inlet means for introducing a dimerizable olefin, a finely divided alkali metal and liquid reaction medium into the first of said compartments, a rotatable shaft extending through the top of said vessel and into the bottom portion of said first compartment, said shaft being provided at its bottom portion with agitating means adapted to agitate reaction mixture in said first compartment, outlet means at the bottom portion of said third compartment for product withdrawal from said vessel, vapor outlet means dispersed in the top portion of said vessel above said third compartment for withdrawal of vapor from said vessel, means for condensing said vapor, means for introducing said condensed vapor into said vessel at a portion thereof above such first compartment and dispersing means disposed inside of said vessel in the vapor space above said first compartment adapted to disperse said condensed vapor onto the interior wall surfaces of said vessel in the vapor space above the reaction mixture to minimize adherence of solid-like reaction products on said interior wall surfaces.

In a still more specific embodiment, such an apparatus comprises as the dispersing means a disc or disc-like member adapted for rotation in a substantially horizontal plane whereby, upon rotation as by means of a shaft to which the agitator is attached, the condensed vapor is introduced into the vessel in a manner to strike the rotating disc resulting in dispersion of the returned condensate onto the interior wall surfaces of the vessel in the vapor space above the reacting mixture. In a still more specific embodiment, agitating means are employed in both the first and second compartments and, preferably, dispersing means are also used in each of said compartments in which case the condensate from the condenser is divided into a portion introduced into the vessel in the vapor space above the first compartment, and a portion introduced into the vapor space above the second compartment. By utilization of dispersing means in the vapor space above each of said compartments, the condensate introduced into the vapor space above such compartments is dispersed onto the vessel walls as aforedescribed.

In order to further describe the invention, reference is made to the accompanying drawings which, for purposes of illustration and not limitation, show a more specific embodiment of an apparatus of this invention. In the drawings, Fig. II is an end view of Fig. I. Although, for such an embodiment, baffle means are shown that extend from the bottom of the vessel thereby providing for overflow of reaction mixture from one compartment to a succeeding compartment, it should be understood that baffle means can be employed that are short of the vessel bottom thereby providing, if desired, underflow of reaction mixture from one compartment to a succeeding compartment.

With reference to the drawing, there is shown a horizontally elongated vessel 10 provided with transverse baffles 11 and 12 spaced-apart so as to form in vessel 10 a first compartment A, a second compartment B, and a third compartment C. The vessel 10 is provided, as shown, with inlets for introduction into compartment A of an alkali metal dispersion via inlet 26, a dimerizable olefin via inlet 28, and make-up liquid reaction medium via inlet 27. Product outlet line 14 is disposed as shown in the bottom portion of the vessel in compartment C and a suitable inlet 13 is provided for introduction of an inert gas (e.g., $N_2$) into the vessel so as to maintain an inert atmosphere. Vessel 10 is also provided with a vapor outlet line 15 at the top of the vessel at an end portion opposite the first compartment, said vapor line passing through condenser 16 from which condensate is passed via lines 17 and 18 into the vapor space above the first compartment. For the embodiment shown, a portion of the condensate from condenser 16 is passed via lines 17 and 19 into the vapor space above compartment B. For maintaining reaction mixture in compartment A under effective agitation, a rotatable shaft 20 (driven by any suitable means, not shown) extends through the top of the vessel into the lower portion of compartment A, the lower end of the shaft 20 being provided with a mixing blade 21 so that, upon rotation of the shaft, effective agitation is maintained in compartment A. In the embodiment shown, vessel 10 is also provided with a similar agitating means designated by agitator 22 and agitating blades 23. In such a specific embodiment, there is shown attached to shaft 20, a disc 24, adapted for rotation in a horizontal plane upon rotation of shaft 20 and a similar disc 25 adapted for rotation with shaft 22. The condensate fed via line 18 and, when used, line 19, are positioned with respect to discs 24 and 25, respectively, so that the condensate introduced via line 18, and similarly via line 19, will fall upon rotating discs 24 and 25 whereupon the condensate is dispersed onto the inner wall surfaces of vessel 10 in the vapor space above the compartment in which the disc is disposed. In use of such an apparatus, the feed materials to compartment A consisting of sodium dispersed in a suitable liquid medium, the olefin to be dimerized and make-up liquid reaction medium are controlled along with the amount of ether reflux via lines 18 and 19 so as to provide in compartment A a flowable reaction mixture which overflows baffle 11 into compartment B and overflows baffle 12 into compartment C from which product withdrawal via line 14 is controlled with the amounts of feed material to compartment A to maintain a desired level in vessel 10.

In a specific operation utilizing an apparatus as shown in the drawings for carrying out a reaction between sodium and butadiene to selectively form disodiooctadienes, a 25% sodium dispersion in alkylate is introduced via inlet 26, dimethyl ether is introduced via line 27 and butadiene via line 28, the amount of butadiene being at a rate of 2.35 parts by weight per part of sodium introduced via inlet 26. The reaction is carried out by feeding dimethyl ether via inlet 27 or, if desired, with the reflux ether via line 18, at a rate sufficient to maintain in vessel 10 a concentration of about 20 parts by weight per part of sodium introduced via inlet 26. By feeding the dimethyl ether at elevated pressure of about 3 pounds and maintaining in the reactor a temperature of about −10° F., the dimethyl ether in reactor 10 is maintained substantially at its boiling point whereupon vaporous dimethyl ether is withdrawn via vapor inlet line 15 and is condensed in condenser 16 utilizing propane at −30° F. The dimethyl ether condensate exiting via line 17 is distributed via lines 18 and 19 into vessel 10 so that the condensed ether falls upon rotating discs 24 and 25 and is dispersed onto the interior wall surfaces of vessel 10 thereby maintaining said wall surfaces substantially free of solid-like reaction products splashed onto said wall surfaces from the highly agitated mixture in compartments A and B. Using such relative amounts of feed materials to compartment A, there results a flowable slurry which overflows from compartment A into compartment B and hence into compartment C wherein control is exercised over outlet 14 for product withdrawal at a rate to keep a desired level in vessel 10 so as to provide for continuous overflow of mixture from compartment A into compartment B and into compartment C.

Although dimethyl ether has been utilized to illustrate a process of the type to which the novel apparatus embodied herein is particularly adapted, such a process can be carried out with use of other liquid reaction mediums in which the selectivity of the dimerized reaction is effected. However, the reaction mediums preferably consist essentially of ethers such as aliphatic monoethers having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of such methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are particularly preferred. The ethers employed should not contain any groups such as hydroxyl, carboxyl, and the like which are distinctly reactive towards an alkali metal such as sodium. Although the ether may react in some reversible manner, it must not be subject to extensive cleavage as cleavage action destroys the ether, uses up sodium, and introduces into the reacting system, alkali metal alkoxides which, in turn, tend to induce rubber-forming reactions (polymerization) rather than the desired dimerization reaction. Although the reaction medium should consist essentially of the specific ethers, other inert media can be present in limited amounts. In general, these inert media will be introduced with the alkali metal as the liquid in which the alkali metal is suspended and will act chiefly as diluents. The concentration of ether in the reaction mixture should at all times be maintained at a sufficient level to have a substantial promoting effect upon the desired dimerization reaction.

Furthermore, and although butadiene has been used as an illustration of a specific olefin in a selective dimerization process, other dimerizable olefins may be used including isoprene, dimethyl butadiene, the pentadienes, as the methyl-1,3-pentadienes, styrene, alkyl-ring substituted styrenes, and the like.

As is apparent from the foregoing description of the invention and its use in the selective dimerization process, the apparatus is adapted for use in carrying out of reactions of the type aforediscussed wherein vaporization of a liquid component of the reaction mixture occurs during the reaction so as to provide for withdrawal of vapor from the reactor and refluxing thereof in a manner to effect the improvement resulting from practice of this invention, residing mainly in maintenance of the reactor substantially free of objectionable build-up of solid-like products.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. An apparatus comprising a horizontally elongated vessel containing a plurality of transverse vertically disposed, spaced-apart baffle means, said baffle means being substantially short of the top of said vessel thereby providing a plurality of compartments extending from one end of said vessel to its other end, inlet means for introducing a dimerizable olefin, a finely divided alkali metal and liquid reaction medium into the first of said compartments at one end of said vessel, agitating means for maintaining reaction mixture in said first compartment under effective agitation, outlet means at the bottom of the opposite end portion of said vessel for product withdrawal from said vessel, vapor outlet means at the top of said opposite end portion of the vessel for withdrawal of vapor from said vessel, condensing means for condensing liquid reaction medium from said withdrawn vapor, means for introducing said condensed liquid reaction medium into said vessel at a portion thereof in the vapor space above said first compartment, and means disposed in the vapor space above said first compartment but short of the top of said vessel adapted to disperse said condensed liquid reaction medium onto the inner wall surfaces of said vessel to maintain said surfaces substantially free of adhering solid-like deposits.

2. An apparatus comprising a horizontally elongated vessel containing two transverse vertically disposed, spaced-apart baffle means short of the top of said vessel thereby providing a three-compartmented vessel, the first of which compartments is defined by one end portion of said vessel and a first baffle, the second compartment being defined by said first baffle and a second baffle and the third compartment being defined by said second baffle and the opposite end of said vessel, inlet means for introducing a dimerizable olefin, a finely divided alkali metal and liquid reaction medium into the first of said compartments, a rotatable shaft extending through the top of said vessel and into the bottom portion of said first compartment, said shaft being provided at its bottom portion with agitating means adapted to agitate reaction mixture in said first compartment, outlet means at the bottom p.rtion of said third compartment for product withdrawal from said vessel, vapor outlet means disposed in the top portion of said vessel above said third compartment for withdrawal of vapor from said vessel, means for condensing said vapor, means for introducing said condensed vapor into said vessel at a portion thereof above such first compartment and dispersing means disposed inside of said vessel in the vapor space above said first compartment adapted to disperse said condensed vapor onto the interior wall surfaces of said vessel in the vapor space above the reaction mixture to minimize adherence of solid-like reaction products on said interior wall surfaces.

3. An apparatus, as defined in claim 2, wherein the dispersing means comprises a disc-like member adapted for rotation in a substantially horizontal plane.

4. An apparatus, as defined in claim 2, wherein the dispersing means comprises a disc-like member adapted for rotation in a substantially horizontal plane whereby, upon rotation, the condensed vapor is introduced into the vessel onto the upper surface of the rotating disc-like member.

5. An apparatus, as defined in claim 2, wherein the dispersing means is a disc-like member adapted for rotation in a substantially horizontal plane, the vessel is provided with means for separately introducing condensed vapor into each of said first and second compartments onto dispersing means disposed in each of said compartments, and agitating means are present in each of the first and second compartments.

References Cited in the file of this patent

UNITED STATES PATENTS

| 1,876,994 | Mann | Sept. 13, 1932 |
| 2,760,850 | Lambert et al. | Aug. 28, 1956 |

OTHER REFERENCES

Petroleum Refiner, pages 93–94, vol. 30, issue No. 2, February 1954.